United States Patent
Garrison

[15] 3,675,701
[45] July 11, 1972

[54] AUXILIARY TIRE TRACK

[72] Inventor: George E. Garrison, 6035 18th S. W., Seattle, Wash. 98106

[22] Filed: June 30, 1970

[21] Appl. No.: 51,063

[52] U.S. Cl. ............................................152/225, 152/239
[51] Int. Cl. .........................................................B60c 27/20
[58] Field of Search ..................................267/225, 239, 241

[56] References Cited

UNITED STATES PATENTS

| | | | |
|---|---|---|---|
| 2,610,665 | 9/1952 | Schonert | 152/225 |
| 2,931,413 | 4/1960 | Randall | 152/225 |
| 3,530,922 | 9/1970 | Mathews | 152/225 |

Primary Examiner—James B. Marbert
Attorney—Graybeal, Cole & Barnard

[57] ABSTRACT

A tire encircling track for increasing the grip of a motor vehicle tire on a road surface comprising a pair of molded flexible rim portions interconnected by transversely extending rib portions to form an adjustable track adapted to encircle a motor vehicle tire. An adjustable self-locking connecting means for holding the ends of the track together and for holding the track itself on the motor vehicle tire is also provided. An additional restraint is provided to hold the track on the vehicle tire prior to locking of the connecting means. In another embodiment, the entire track is molded as a single flexible unit.

8 Claims, 13 Drawing Figures

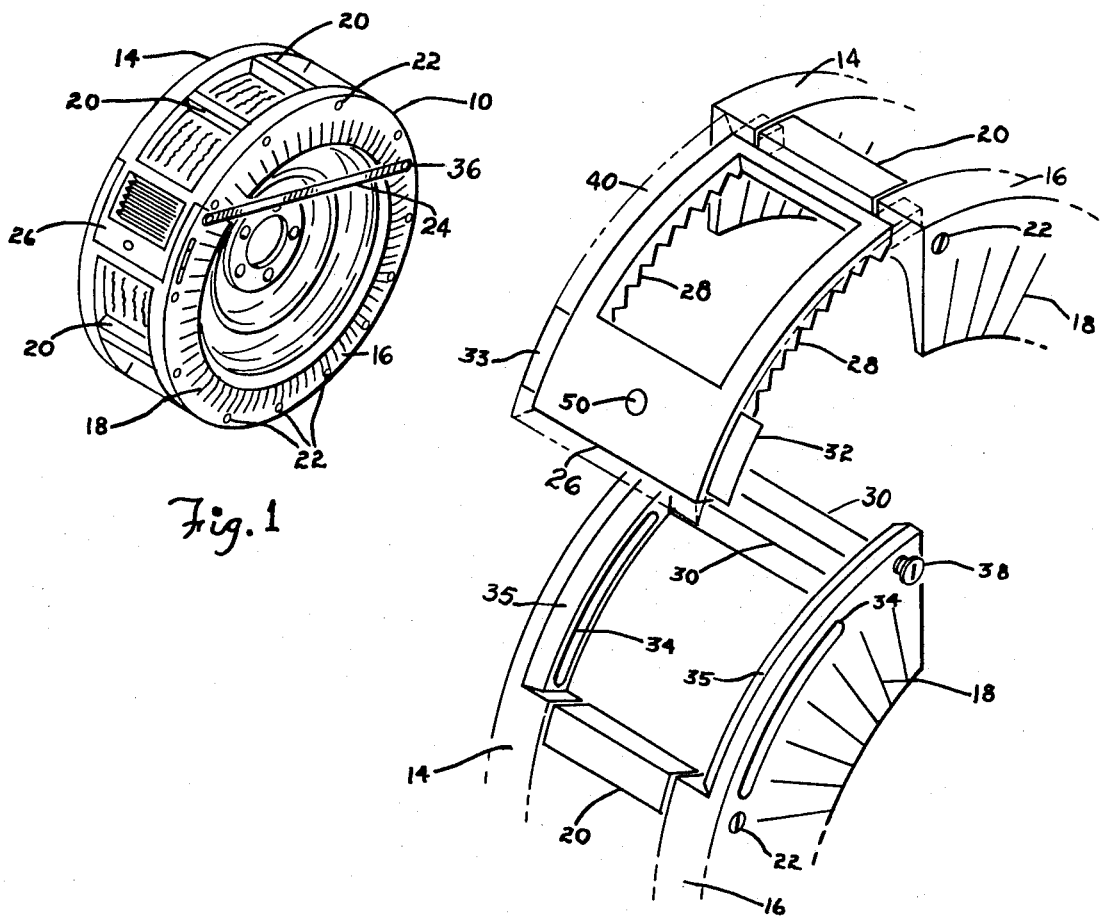
Fig. 1
Fig. 2
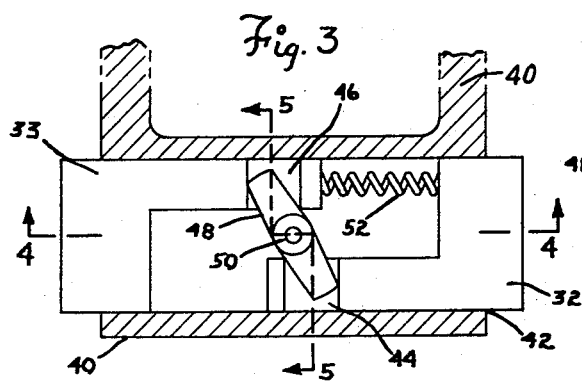
Fig. 3
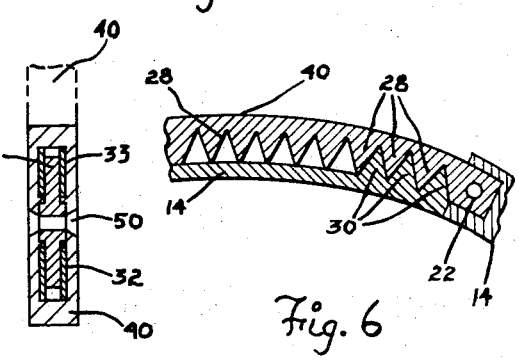
Fig. 6
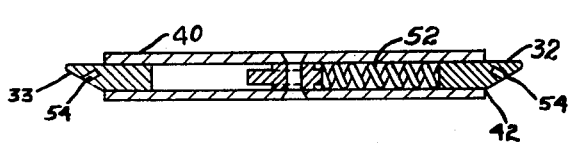
Fig. 4
Fig. 5
INVENTOR.
GEORGE E. GARRISON
BY
Braybeal, Cole & Barnard INVENTOR.
GEORGE E. GARRISON
BY
Draybeal, Cole & Barnard

PATENTED JUL 11 1972

INVENTOR.
GEORGE E. GARRISON
BY
Traybeal, Cole & Barnard 3,675,701

AUXILIARY TIRE TRACK

BACKGROUND OF THE INVENTION

1. Field of the Invention

The present invention relates, in general, to apparatus for increasing the frictional grip of a motor vehicle tire on a roadway, and in particular, to a flexible, at least partially molded, tire encircling track having a self-locking latch operable in response to the running of the vehicle tire thereover.

2. Description of the Prior Art

It is well known that the grip of a motor vehicle tire on the roadway on which it is traveling is significantly reduced in the presence of snow or ice or on wet and muddy roads. The most common method increasing the grip of the tire on the road surface is by placing anti-skid chains on the drive wheels of the traveling vehicle. Anti-skid chains generally consist of a pair of metal link chains extending generally parallel to each other which are interconnected by smaller pieces of chain extending transversely therebetween. These constructs are disposed around a vehicle tire such that the shorter cross pieces extend transverse the treads of the tire and are serially disposed between the tire and the roadway as the vehicle travels. Traction increasing devices of this sort are difficult and bothersome to mount on a vehicle, generate an excessive clanking noise when the vehicle is in motion and are likely to become entangled about the axle of the vehicle should one of the tire encircling chains break.

Another technique for increasing the grip of the tires of a vehicle on snow, ice or mud is the implantation of metal studs in the tire. It is undesirable to use metal studded tires on dry pavement, however, and thus both unstudded and studded tires must be purchased by the vehicle owner. Not only does this result in significant expense, but also, the vehicle must be jacked and the entire wheel removed when it is desired to change from one to the other. Other prior art attempts to solve this problem include Randall U.S. Pat. No. 2,931,413 wherein a tire device employing steel cables to hold traction bars in position about the surface of the tire of a vehicle is disclosed, while an auto skid chain made up of a series of U-shaped pivotally joined metal links is disclosed in Connell, U.S. Pat. No. 3,251,392.

BRIEF SUMMARY OF THE INVENTION

The present invention relates to an auxiliary track adapted to mount circumferentially on a vehicle tire. The track comprises a pair of flexible molded rims, made preferably of reinforced rubber or other suitable elastomeric material, which have a tendency to coil toward a circular position and which are held generally parallel with respect to each other by traction bars interconnected transversely therebetween. The molded rims and interconnected traction bars define a flexible track suitable for disposition over the treads of a vehicle tire. Connecting means disposed near the opposite ends of the track are adapted to interconnect to hold the ends of the track in fixed relation with respect to each other and to hold the entire track on the vehicle tire. The connecting means includes an interlocking toothed portion which prevents sliding of the ends of the track over each other, and a cooperating tongue and slot portion which is locked by the rotation of the wheel thereover. The molded rim portions of the track are notched on their radially inward surface to increase their flexibility, and additionally include contoured facing portions which are adapted to grip the tread face and adjoining side walls of the tire to prevent lateral slippage of the track on the vehicle tire. The gripping of the tire by the rims aligns the track on the tire such that the connecting means on the ends of the track are disposed for automatic interconnection as the tire rotates as will be described hereafter. Additionally, the transverse traction bars are longitudinally adjustable such that the transverse dimension of the auxiliary track may be varied for use on tires of varying size. A restraint is additionally provided to hold the track on the vehicle tire during rotation of the tire prior to locking of the connecting means. In a second disclosed embodiment, the entire tire encircling track is molded as a single unit, preferably of reinforced rubber on other suitable elastomeric materials.

It is an object of the present invention, therefore, to provide an auxiliary track for a vehicle tire of at least partly molded construction.

Another object is to provide an auxiliary track having an automatically locking connecting means.

One more object is to provide an auxiliary track having adjustable and replaceable traction bars.

Still another object os to provide an auxiliary track having a restraint for holding the track on a vehicle tire prior to locking of the connecting means.

One more object is to provide an auxiliary track which is both durable and inexpensive to manufacture.

Another object is to provide an auxiliary track having an uninterrupted riding surface to reduce vibration.

Still another object is to provide an auxiliary track which may be easily and quickly installed or removed without jacking the vehicle.

One more object is to provide an auxiliary track of entirely molded construction. Additional objects and advantages of the present invention will be apparent from the following description, taken in conjunction with the accompanying drawings.

BRIEF DESCRIPTION OF THE DRAWINGS

FIG. 1 is a perspective view of the auxiliary track of the present invention mounted on a vehicle tire.

FIG. 2 is a partial perspective view of the automatic connecting means of the present invention.

FIG. 3 is a sectional plan view of the retractable tongue latch of the present invention.

FIG. 4 is a sectional view taken along line 4—4 of FIG. 3.

FIG. 5 is a sectional view taken along line 5—5 of FIG. 3.

FIG. 6 is a sectional elevation view of the interlocking tooth connection of the present invention.

DETAILED DESCRIPTION OF THE INVENTION

Figure 7:
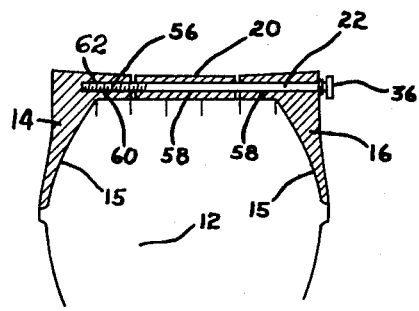
FIG. 7 is a transverse sectional view of the molded rim and traction bar embodiment of the present invention, including an external lug for mounting a restraint.

Referring now to FIG. 1, an auxiliary track or over-tire 10 is disclosed mounted circumferentially about a conventional motor vehicle tire 12. Track 10 includes elongate rim forming members or rim portions 14 and 16 having slots 18 on their radially inward portions. Ribs 20 are spaced transversely between rims 14 and 16 about the circumference of the rims and are connected therebetween by pins 22. As will hereinafter be explained in greater detail, the members 20 are interconnected between continuous hoop portions of the rims 14 and 16 which in use are situated outwardly adjacent the edges formed where the side wall and tread portions of the vehicle tire meet.

Referring also to FIG. 2, connecting means 26 comprising interlocking teeth 28 and 30 and retractable tongues 32 and 33 and cooperating slots 34 are disclosed. Restraint 24 extends between lugs 36 and 38 to additionally hold track 10 on the vehicle tire. Restraint 24 also prevents the track from falling from the tire during mounting of the track on the vehicle tire as will be described more completely hereafter.

Figure 8:
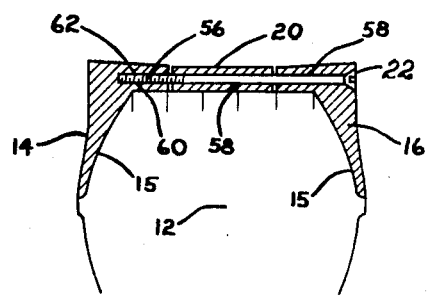
FIG. 8 is a transverse sectional view of the molded rim and traction bar embodiment of the present invention.
Figure 10:
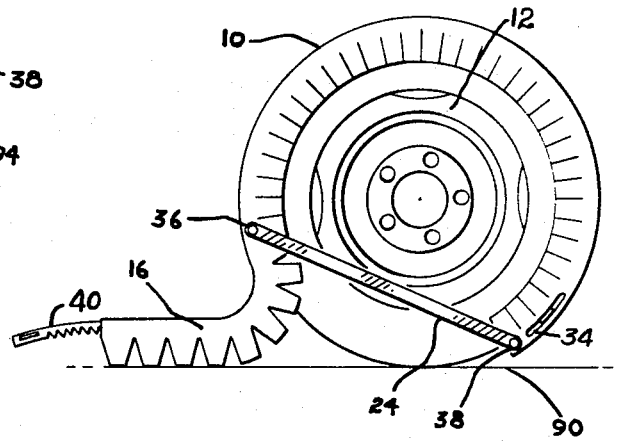
FIG. 10 is a diagrammatic illustration of the auxiliary track disposed over a vehicle tire prior to rotating the tire to interconnect the ends of the track, including a restraint.

Molded rims 14 and 16 may be constructed of synthetic rubber or plastic materials of a type sufficiently durable to withstand the pressure and abrasive forces associated with the running surface of the tire of a motor vehicle. Radial slots 18 provide additional longitudinal flexibility to the rims allowing them to be bent to conform to the circular shape of tire 12, while, as shown in FIG. 10, they can be easily flexed in the opposite direction during installation. Referring also to FIGS. 7 and 8, it will be seen that the inner facing surfaces 15 of rims 14 and 16 are contoured to conform, in general, to the shape of the treads and adjacent side walls of tire 12. The conformance of the rims to the tire prevents transverse slippage of the track across the treads of the tire while the motor vehicle is traveling.

Connecting means 26 includes member 40 mounted longitudinally on the ends of rims 14 and 16, and held in place by pin 22 extending through holes in the end portions thereof (not shown). Member 40 may be constructed of metal or plastic, and teeth 28 may be formed thereon or be bonded thereto. Teeth 28 are adapted to mate with teeth 30 which extend between the distal ends of rims 14 and 16, and which are preferably made of the same material as teeth 28.

Referring to FIGS. 3-5, it will be seen that member 40 additionally includes retractable tongues 32 and 33, the ends of which extend into slots 34 in rims 14 and 16 to prevent interlocked teeth 28 and 30 from separating after the track is locked on a vehicle tire. Tongues 32 and 33 are disposed in transverse slot 42 near one end of member 40. As disclosed, tongues 32 and 33 are substantially L-shaped and include slots 44 and 46 which are adapted to receive the ends of a central pivoting member 48. Member 48 is mounted for rotation on fixed shaft 50 which extends through the opposed walls of slot 42. Slots 44 and 46 are of slightly greater cross-section than pivotal member 48, and are related such that the movement of either tongue is transmitted to the other. Spring 52 is fixedly connected between tongues 32 and 33 to bias these tongues toward a position of rest substantially as shown in FIG. 3 such that the tongues extend outwardly approximately the same distance on each side of member 40. Notches 54 are provided in the outer ends of tongues 32 and 33 and are adapted to receive a tool such as a screwdriver or the pry end of a lug wrench. It will be readily understood that the movement of either of these tongues by the application of inward pressure thereto causes member 48 to pivot within slots 44 and 46 such that the inward movement of the tongue on which the force is applied is transmitted to the remaining tongue causing it to also move inwardly with respect to slot 42. The movement of tongues 32 and 33 toward each other compresses spring 52 such that release of the externally applied pressure results in spring 52 moving the tongues outwardly to the rest position shown in FIG. 3. As is best seen in FIG. 4, the outer ends of tongues 32 and 33 are slanted such that they cooperate with beveled surfaces 35 (FIG. 2) to cause tongues 32 and 33 to recede within slot 42 when member 40 is moved such that teeth 28 and 30 intermesh. It will be readily understood that after tongues 32 and 33 have passed over beveled surfaces 35 and moved adjacent slots 34, the tongues are urged outwardly into these slots by spring means described hereafter, thereby locking the ends of the track together.

In FIG. 6, the interlocking relationship of teeth 28 and 30 when the ends of the track are joined is disclosed. Three teeth 30 disposed adjacent slots 34 are adapted to mate selectively with certain of teeth 28 mounted on member 40. It will be readily understood that differences in the circumference of the tire on which the auxiliary track is to be mounted, due to inflation pressure or temperature for example, are compensated for by different sets of teeth 28 mating with teeth 30. If the tire is larger than normal, teeth 28 near tongues 32 and 33 will be found to mate with teeth 30, while teeth nearer the opposite end of latch 40 will be found to mate with teeth 30 when the tire is of smaller circumference. The accuracy of the alignment of track 10 on tire 12 and the existence of any significant amount of space between the tire tread and inside of track 10 may also determine which teeth 28 will mate with cooperating teeth 30.

Teeth 28 and 30 are of sufficient height that they cannot be pulled over each other so long as tongues 32 and 33 are disposed in slots 34. It will thus be seen that it is the interlocking teeth which hold the opposite ends of rims 14 and 61 in fixed relation to each other, while tongues 32 and 33 disposed in slots 34 prevent the interlocked teeth from separating.

Referring now to FIGS. 7 and 8, the connection of rims 14 and 61 through rib 20 is disclosed. Pin 22 having threads 56 on one end extends through channels 58 in rim 16 and rib 20, and into channel 60 in rim 14. Channel 60 includes internal threads 62 which cooperate with threads 56 on pin 22 to hold the rims and rib in relatively constant spaced relation with respect to each other. The depth of the disposition of pin 22 in channel 60 determines the distance between rims 14 and 16, and thus it will be readily understood that movement of pin 22 in slot 60 allows the width of the track to be adjusted to tires of varying tread width. Lug 36 is provided on pin 22 to receive the cooperating end of a resilient restraint 24. Restraint 24 may be constructed of conventional shock cord, of 5/8 inch diameter, for example, or an apparatus such as the levered restraint illustrated in FIG. 13, which will be more fully described hereafter, may be used. Lugs 36 and 38 provide a convenient method for connecting restraint 24 between distal portions of rim 16, but it is understood that other conventional means of connecting the restraint to the rim may also be used.

Figure 13:
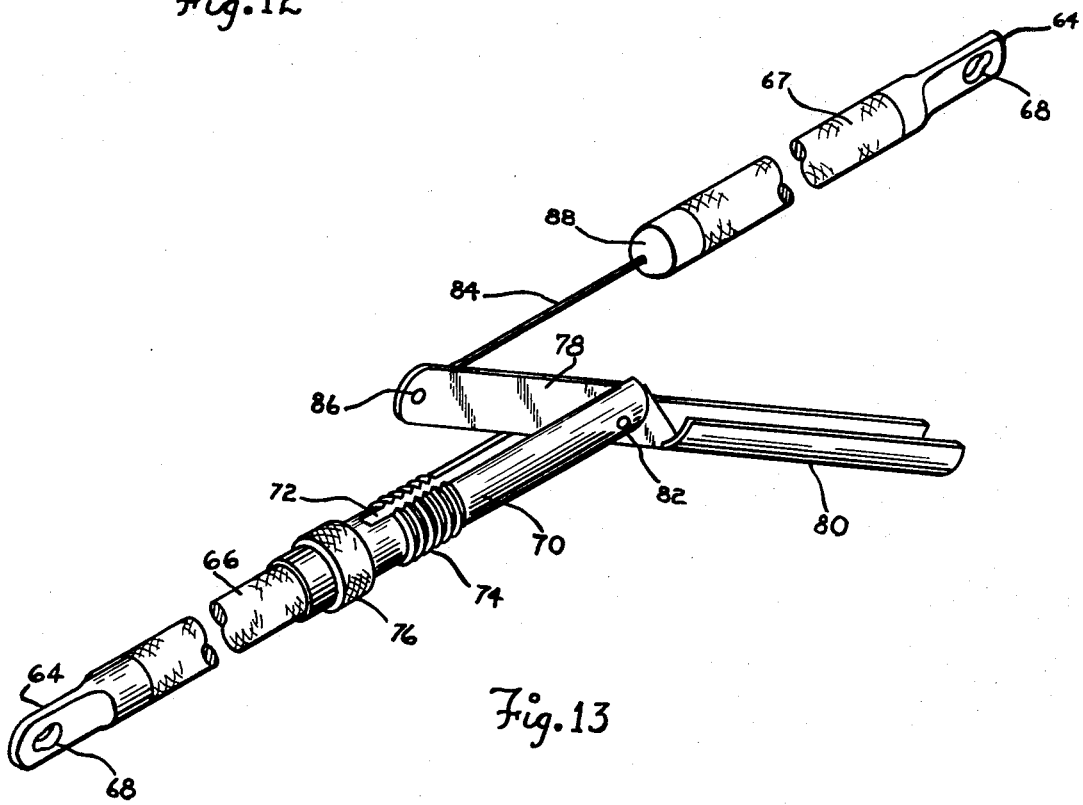
FIG. 13 is a partial perspective view of a levered restraint.

The levered restraint apparatus of FIG. 13 comprises end portions 64 which are connected to resilient portions 66 and 67. The end portions include conventional fittings 68 adapted to cooperate with lugs 36 and 38 described above. Resilient portions 66 and 67 may be conventional shock cord, coil springs or other suitable resilient material. Lever support arm 70 is connected to the end of resilient portion 66 distal end portion 64 and includes a central slot 72, external threads 74 and longitudinally movable nut 76 having internal threads adapted to cooperate with threads 74. Lever 78 having handle portion 80 is mounted on support arm 70 by means of pin 82 about which it may be pivoted. Wire or cable 84 is connected at one end to lever 74 by rivet 86 or other conventional connecting means, and at its other end to fitting 88 disposed on the end of resilient member 67. Handle 80 is concavely shaped to conform, in general, to the external shape of resilient member 67.

In operation, nut 76 is rotated such that it travels longitudinally on threads 74 towards resilient member 66 such that lever 78 may be pivoted out of slot 72 to a position substantially transverse lever support 70. It is understood that pivoting lever 78 in this direction increases the length of the restraint and allows it to be easily interconnected between lugs 36 and 38. Lever 74 is then pivoted into slot 72 such that handle 80 is moved adjacent resilient portion 67. Nut 76 is moved on threads 75 to lock lever 74 in a position substantially parallel to lever support 70. Pivoting of handle 80 towards resilient member 67 tends to draw lugs 36 and 38 toward each other thereby holding track 10 on the tire.

Figure 9:
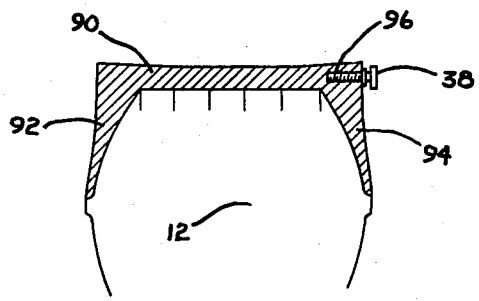
FIG. 9 is a transverse sectional view of the one piece molded embodiment of the present invention, including a lug for holding a restraint.

Referring now to FIG. 9, the construction of an auxiliary track having rims and ribs molded as a single unit is disclosed. Track 90 is a unitary piece shaped substantially the same as the double rim end rib construction described above. The inner surfaces of the side walls 92 and 94 are contoured to conform in general to the shape of the treads and adjacent side walls of tire 12. One method of mounting lug 38 to the molded track 90 comprising threading the lug into a cooperatingly threaded hole 96 is disclosed. Although the transverse dimension of the all molded track 90 may not be varied as in the separate rim and rib construction described above, it is believed that this construction would result in significant manufacturing cost savings. Although not illustrated, connecting means 26 may be mounted to the ends of track 90 in substantially the same manner as that disclosed in FIG. 2. It is also contemplated, that member 40, teeth 28 and 30 and slots 34 might all be molded as an integral part of track 90.

Figure 11:
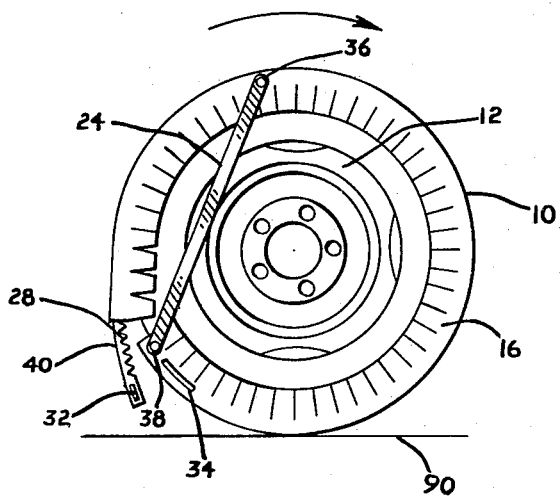
FIG. 11 is a diagrammatic view of the track and tire of FIG. 10 partially rotated.
Figure 12:
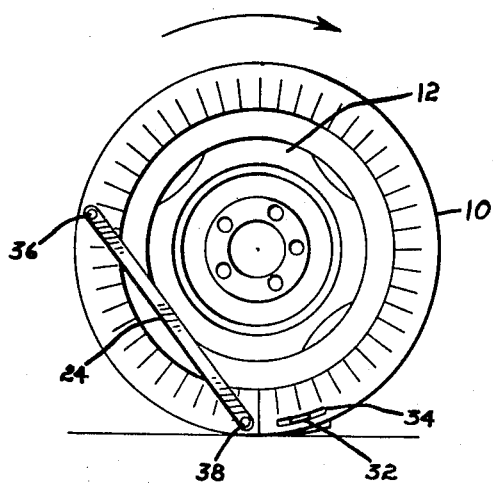
FIG. 12 is a diagrammatic view of the tire and track of FIG. 10 rotated such that the locking means is beneath the tire.

Referring now to FIGS. 10–12, the manner of mounting an auxiliary track 10 on a vehicle tire 12 is disclosed. Referring first to FIG. 10, track 10 is disposed over the top portion of tire 12 resting on roadway 90. Restraint 24 is connected between lugs 36 and 38 to hold the track on the tire while it is rotated. It is understood that the levered restraint of FIG. 13 may be substituted for restraint 24 if desired. The end of track 10 adjacent member 40, is bent such that it extends along the ground behind tire 12.

Referring now to FIG. 11, wheel 12 is rotated such that the end of track 10 bearing slots 34 passes beneath the wheel. As tire 12 rotates, the end of track 10 bearing member 40 follows the track about the tire and assumes a position wherein teeth 28 are disposed above cooperating teeth 30 while tongues 32 and 33 are disposed adjacent slots 34. As the wheel continues to rotate, restraint 24 causes the end of track 10 on which lug 38 is mounted to follow the tire after it has passed therebeneath, rather than falling off onto the pvement as would be its natural tendency absent this restraint.

Referring now to FIG. 12, it will be seen that as the tire passes over connecting means 26, teeth 28 and 30 interlock and tongues 32 and 33 which are aligned above slots 34 are forced over beveled portions 35 and into slots 34 such that they extend outwardly therethrough. After one rotation of the wheel, track 10 is fixedly mounted on the tire, and will remain firmly mounted thereon until manual removal by the application of inward pressure to tongues 32 and 33 forcing them out of slots 34, and disconnecting of restraint 24 such that the track falls from the wheel if it is rotated.

The molding of rims 14 and 16 or of the entire track 90 allows non-skid materials such as sawdust to be added thereto during molding to improve the frictional characteristics of the completed track. It is also contemplated that metal lugs might also be mounted in the molded rims or track.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes that come within the meaning and range of equivalency of the claims are therefore to be embraced therein.

What is claimed is:

1. A traction increasing over-tire for a vehicle tire which in use envelopes the peripheral tread and side wall portions of said vehicle tire, said over-tire comprising:

a pair of flexible rim forming members of sufficient length to be wrapped circumferentially around the vehicle tire so as to occupy positions at least partially outwardly adjacent side wall portions of such vehicle tire, said rim forming members being molded from a durable pressure and abrasive force withstandinG material, each to coil towards a circular shape corresponding in diameter to its position on the vehicle tire;

traction bar means interconnected between said rim forming members and in use extending transversely across the tread portion of the vehicle tire; and connector means for securing said over-tire on said vehicle tire by connecting together opposite end portions of the rim forming members after the traction tire is installed on the vehicle tire.

2. The over-tire of claim 1, wherein said rim forming members have continuous hoop forming portions which in use are outwardly adjacent the edges of the vehicle tire formed where the side wall portions join the tread portion of the vehicle tire, and side portions which in use are outwardly adjacent the side wall portions of the vehicle tire, said side portions being radially slotted to increase the flexibility of the rim forming members.

3. The over-tire of claim 1, wherein said transversely extending traction bar means each includes a centrally disposed longitudinal pin connecting it to the hoop forming portions of the rim forming members.

4. The over-tire of claim 1, wherein the transversely extending traction bar means are each adjustable in length.

5. The over-tire of claim 1, wherein said connector means comprises complementary members at the opposite ends of the rim forming members having interlocking means which are automatically lockable into engagement by the vehicle tire rolling thereover once the over-tire has been draped circumferentially about the vehicle tire and its two ends brought together.

6. The over-tire of claim 1, wherein said connector means includes first interlocking portions holding the end portions of the rim forming members in fixed relation to each other, and second locking portions adapted to maintain said first portions in interlocked relationship during normal rotation of the vehicle tire.

7. The over-tire of claim 6, wherein said first interlocking portions comprise sets of interlocking teeth, and said second locking portions comprise oppositely extending retractable tongues and cooperating slots.

8. The over-tire of claim 1, further including a restraint extending between opposite end portions of the over-tire to hold same on said vehicle tire prior to engagement of said connector means.

* * * * *